No. 767,075. PATENTED AUG. 9, 1904.
S. M. MARTIN.
HAY TEDDER ATTACHMENT FOR MOWING MACHINES.
APPLICATION FILED MAY 19, 1903.
NO MODEL. 2 SHEETS—SHEET 2.

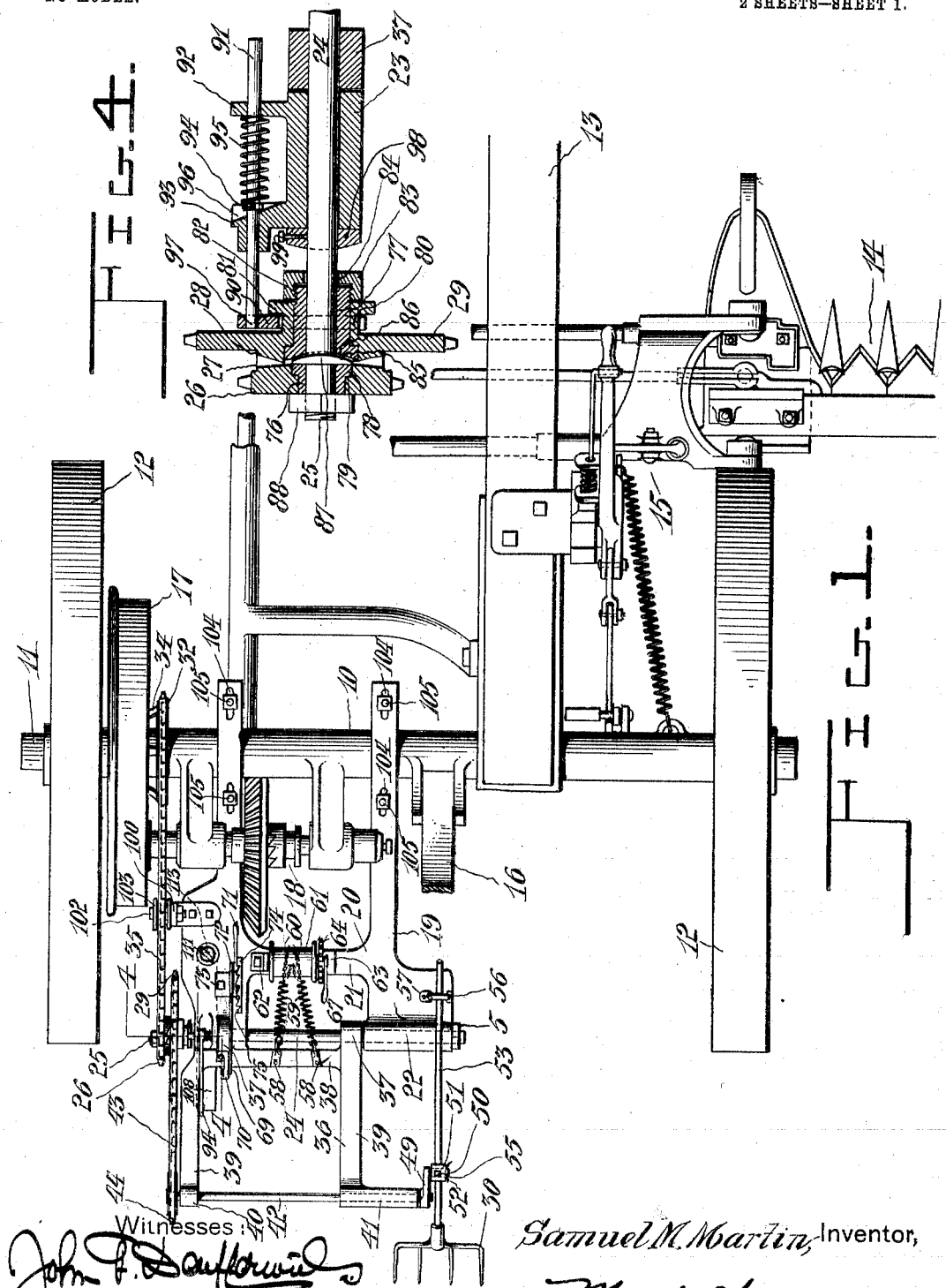

Witnesses:
Inventor,
Samuel M. Martin,
By Marion & Marion
Attorneys

No. 767,075.

Patented August 9, 1904.

UNITED STATES PATENT OFFICE.

SAMUEL MACLEOD MARTIN, OF HEATHERDALE, CANADA.

HAY-TEDDER ATTACHMENT FOR MOWING-MACHINES.

SPECIFICATION forming part of Letters Patent No. 767,075, dated August 9, 1904.

Application filed May 19, 1903. Serial No. 157,886. (No model.)

*To all whom it may concern:*

Be it known that I, SAMUEL MACLEOD MARTIN, a subject of the King of Great Britain, residing at Heatherdale, county of Kings, Province of Prince Edward Island, Canada, have invented certain new and useful Improvements in Hay-Tedder Attachments for Mowing-Machines; and I do hereby declare that the following is a full, clear, and exact description of the invention, such as will enable others skilled in the art to which it appertains to make and use the same.

My invention relates to harvesting, and relates especially to the harvesting of hay or similar products of the soil.

The object of the invention is to provide an attachment adapted to be connected to a mowing-machine, which attachment will be capable of performing the functions of the implement sometimes used upon farms and known as a "hay-tedder." These implements, it will be remembered, are for the purpose of turning over the hay as it lies curing upon the ground, and they usually comprise a fork or a similar contrivance which is actuated by the advance of the implement in such a manner as to turn over the hay lying upon the ground in the manner suggested, the implement usually being drawn along by a horse.

In its general construction this invention comprises a tedder-frame adapted to be clamped to the frame of the mowing-machine, which tedder-frame carries certain mechanism, all of which coöperates for the purpose of actuating a certain fork, the function of which is to disturb the hay. The mechanism carried upon the tedder-frame is driven in a simple manner from the main axle of the mowing-machine, this mechanism including an arrangement by means of which the actuation of the tedder-fork may be discontinued and the fork disconnected from the mowing-machine driving mechanism as far as the operation of the fork is concerned.

The invention consists in the construction and combination of parts to be more fully described hereinafter, and definitely set forth in the claims.

In the drawings, which fully illustrate my invention, Figure 1 is a plan representing a portion of an ordinary mowing-machine to which my invention has been applied. Fig. 2 is also a plan, but upon a much enlarged scale, a portion being shown in section, as will appear. This view is concerned almost entirely with presenting the hay-tedder, only a small portion of the frame of the mowing-machine being shown. Fig. 3 is substantially a side elevation of the parts shown in Fig. 2, the axle of the mowing-machine, however, being shown in section together with a portion of the tedder-frame. Fig. 4 is a section upon an enlarged scale and is supposed to be taken substantially on the line 4 4 of Fig. 1.

Throughout the drawings and specification the same numerals of reference indicate like parts.

Referring more particularly to the parts, 10 represents the mowing-machine frame, which is supported upon the main axle 11, which carries the usual main wheels 12 at its extremities. To this frame is attached the usual pole 13, adapting the implement to be drawn by a horse or horses, the usual mower-bar 14 being shown in connection with mechanism 15 for controlling and actuating the same. At a suitable point the frame 10 supports a seat-post 16, which carries a seat for the driver in the usual manner. Adjacent to the left-hand main wheel 12 the axle 11 has rigidly mounted thereupon the usual main driving-gear 17, which operates through mechanism 18, usually used in mowing-machines for the purpose of transmitting motion of the driving-wheel to the aforesaid mechanism 15 and mower-bar 14.

In applying my invention to a mowing-machine such as I have described I provide a tedder-frame 19, which comprises a pair of oppositely-disposed extensions 20 and which frame lies to the rear of the frame 10 of the mowing-machine in the manner indicated. A web 21 connects the said extensions 20, and behind these extensions the tedder-frame projects rearwardly, where it is formed into oppositely-disposed housings or bosses 22 23 in the manner shown. The main axle 24 of the tedder passes through these bosses, being disposed parallel to the aforesaid axle 11, and its projecting extremity 25 carries rigidly a sprocket-wheel 26, the hub 27 whereof is formed with teeth, as indicated, which teeth coöperate with corresponding teeth on a similar hub 28, which hub constitutes a portion of a larger sprocket-wheel 29. These sprocket-wheels afford means for driving the tedder-fork 30 in the manner which will appear hereinafter. It may be said at this point that these two sprocket-wheels in connection with their hubs, formed as described, constitute a clutch, which clutch when in its closed or operative position transmits to the aforesaid fork 30 the motion of the main driving-axle 11. For this purpose the hub 31 of the main gear 17 is adapted to receive a main sprocket-wheel 32, which may be attached thereto by means of the oppositely-disposed set-screws 33, the arms 34 of this sprocket-wheel being offset, as shown, so as to carry the main driving-chain 35 in alinement with the aforesaid sprocket-wheel 26. This offset arrangement is adopted for the purpose of insuring proper clearance between the sprocket-chain 35 and the main gear 17.

A fork-frame 36 is provided which is disposed to the rear of the tedder-frame 19 aforesaid, and this fork-frame is provided forwardly with the hubs or bosses 37, through which pass the aforesaid main tedder-axle 24. It should appear that the outer faces of these hubs 37 lie adjacent to the inner faces of the aforesaid bosses 22 and 23. It should also appear that in its general construction this fork-frame comprises a web 38, which connects the rearward extensions 39, the said web being substantially parallel to the aforesaid web 21 and the axle 24. It will be observed that at the rear the extensions 39 are formed into housings or bosses 40 and 41, and in these housings there is rotatably mounted a fork-shaft 42. It should be observed that this fork-shaft 42 is continuously rotated during the operation of the tedder-fork, the mechanism for this purpose including the aforesaid sprocket 29, which connects, by means of the auxiliary sprocket-chain 43, with a sprocket-wheel 44, which sprocket-wheel is rigidly carried by the fork-shaft 42. At its opposite extremity the fork-shaft 42 carries a crank 49. Its crank-pin 50 carries a small bracket or coupling 51, in which the crank-pin is rotatably mounted, a split pin 52 being employed in this connection. Through this bracket 51 passes a lateral extension 53 of the fork handle or shank 54, it being understood that the extension 53 is longitudinally adjustable in this bracket and that it may be clamped thereto by means of the set-screw 55. It should appear that the extension 53 is substantially at right angles to the body of the handle 54. Upon the rear portion of the tedder-frame there is provided a fixed guide 56, which consists of an inverted-U-shaped member having lateral feet 57, by means of which it is attached to the tedder-frame in the manner shown. As will be observed, the extension 53 passes through this guide 56 in the manner indicated, and it should be understood that this guide is instrumental in giving the proper movement to the fork 30 aforesaid, which fork, it will appear, is carried upon the lower extremity of the handle 54. From the arrangement described it should readily appear that when the aforesaid clutch, which is composed of the sprocket-wheels 26 and 29, is closed or in its operative position the rotatory movement of the main axle 11 will be transmitted to the aforesaid fork-shaft 42, and it will readily appear that a peculiar motion will be given to the fork by reason of the manner in which it is supported, guided, and driven. As the rearward motion of the fork progresses the point of connection of the handle with the crank 49 rises, and the aforesaid guide 56 operates to depress the extension 53 of the handle in such a manner as to project the fork 30 with considerable velocity. As it rises the fork picks up a certain amount of hay, which it turns over in this manner.

In order to resiliently support and at the same time to steady the fork-frame, the aforesaid web 38 thereof is provided with a pair of hooks 58, to which attach the helical springs 59, which are disposed in an inclined direction, as indicated. To their forward extremities the chains 60 attach, which chains are wrapped upon a drum 61, this arrangement being adopted for the purpose of increasing the tensile force in the springs when desired. To this end the bracket 63, which coöperates with the bracket 62 to rotatably support the said drum, is provided with a fixed quadrant 64, provided with the peripheral teeth 65, as shown, and the axle 66 of the drum carries rigidly the lever 67, which lever may be locked in any angular position upon the segment 64 by means of locking mechanism 68, adapted to be operated by the fingers. From this arrangement, evidently, by wrapping more of the chains upon the drum the tension of the springs will be increased.

Arrangement is made for raising or lowering the fork-frame, the mechanism for this purpose including a link 69, which is attached at its rearmost extremity to a standard 70, fixed to the fork-frame and projecting upwardly therefrom, as shown, the forward extremity of this link being attached to a hand-lever 71 at the point 72, this lever being suitably mounted at its foot in a bracket 73, attached to the rear portion of the tedder-frame. This lever coöperates with a fixed quadrant 74, having teeth 75, which incline toward the rear of the machine. From this arrangement it should appear that the lever 71, coöperating with the springs 59 aforesaid, affords means for maintaining the fork-frame in a substantially fixed position. At the same time the presence of the springs permits a certain desirable resiliency.

The clutch-operating mechanism will now be described, and reference will now be had especially to Figs. 2 and 4. It should appear that the aforesaid sprocket-wheels 26 and 29 are provided, respectively, with bushings 76 and 77, which have collars 78 at their inner extremities, which are received in the counterbores 79, provided for that purpose. It should also be observed that the sprocket-wheel 29 comprises a hub 80 upon its inner side, which hub terminates in the laterally-projecting collar 81, which collar affords means for moving the sprocket-wheel 29 laterally upon the axle 24 in a manner which will be described hereinafter. The bushing 77 has a threaded extremity 82, upon which there is mounted a nut 83, provided with an opening 84, through which the said axle 24 passes. It should be observed, too, that the extremity of the bushing 77 adjacent to the bushing 76 is given a concave form, as indicated at 85, and adjacent to this concave surface a similiarly-concaved face 86 of a collar 87 lies, the said collar being located between the two bushings in the manner shown. A suitable nut 88 is mounted upon the threaded extremity of the projecting axle 25. A yoke 90 is provided, which lies behind the aforesaid collar 81 in such manner as to enable a movement of the yoke to effect a movement of the sprocket-wheel 29 and its connected parts. This yoke is attached to the extremity of a shifting stem 91, which is guided in openings in the wings 92 93, which project upwardly from the upper side of the boss 23 aforesaid. A shifting lever 94 is rigidly secured to this stem at the point indicated, and a helical spring 95, which is disposed behind the same, thrusts at its rear against the aforesaid wing 92 in such a manner as to constrain the yoke 90 aforesaid in a position which will maintain the clutch closed. The inner face 96 of the aforesaid wing 93 is inclined, as indicated, and the lever 94 rests against this face, from which arrangement evidently by rotating the lever a longitudinal adjustment of the stem 91 may be effected, it being understood that the extremity of the stem 91 is rotatably mounted at 97 in the aforesaid yoke 90. From this arrangement it should readily appear that a movement of the shifting lever 94 will control the condition of the clutch. A collar 98 is provided having a set-screw 99, which collar abuts against the outer face of the aforesaid boss 23 and is rigidly secured to the axle 24, as will be readily understood, for the purpose of preventing longitudinal movement of the said axle. Also in furtherance of this purpose the opposite extremity of the axle is provided with a nut 5. Arrangement is made for tightening the sprocket-chain 35 when necessary. To this end a standard 100 is provided, which is carried by the tedder-frame 19 at a suitable point, and this standard is provided with a vertical slot 101, through which passes a bolt 102, which bolt affords means for adjustably securing a tightening-pulley 103, it being observed that the lower face of this pulley may be moved into the path of the chain.

The manner of attaching and supporting the tedder-frame 19 will now be described. Referring especially to Figs. 2 and 3, the aforesaid extensions 20 of the tedder frame are each provided with a pair of longitudinally-disposed slots 104, through which slots pass the upper extremity of bolts 105. These bolts afford means for clamping the extensions 20 to the frame 10 by means of the clamping-blocks 106, which are disposed oppositely to each other and provided with curved faces 107, which coöperate so as to conform to the outline of the frame, as will appear. Evidently the presence of the slots 104 enables the tedder-frame to be adjusted in a front and rear direction. Toward its rear and at the left the tedder-frame is supported upon a trailer-wheel 108, which wheel is carried upon a rearwardly-curved fork 109, which fork terminates above in a collar 110, beyond which there is a vertical shank 111, the upper extremity of which passes through a suitable bearing 112, carried by the tedder-frame, it being understood that the said shank turns freely in the said bearing. Above the bearing the shank 111 is provided with a transverse pin 113. The lower face of the bearing 112 is formed into a socket 114, which receives the upper extremity of a helical spring 115, the lower extremity of which spring thrusts against the aforesaid collar 110 and evidently affords means for resiliently supporting the tedder-frame at this point.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

Having described my invention, what I claim as new, and desire to secure by Letters Patent, is—

1. In an implement of the class described, in combination, a tedder-frame adapted to be attached to the frame of another implement, a fork-frame carried by said tedder-frame upon a substantially horizontal axis, a fork carried by said fork-frame, means for actuating said fork by the advance of said other implement, springs constraining said fork-frame and obliquely disposed, a drum carried by said tedder-frame, chains carried by said springs and connected with said drum, means for adjusting said drum, a clutch through which said fork is actuated, and means for controlling said clutch.

2. In an implement of the class described, in combination, a tedder-frame, clamps carried by the forward extremity thereof and adapted to be attached to the frame of another implement, a fork, a shaft, means for driving said shaft by the advance of said other implement, a crank carried by said shaft, a shank to which said fork is attached, means for pivotally mounting said fork upon said crank, said shank having a forward extension, and an enlarged U-bolt attached to said frame and constituting a guide for said shank when said crank rotates.

3. In an implement of the class described, a tedder-frame, clamps carried by the forward extremity thereof and adapted to be attached to the frame of another implement, a wheel below said tedder-frame, means for resiliently supporting said tedder-frame upon said wheel, a fork-frame carried to the rear of said tedder-frame, a fork carried thereby, means for actuating said fork by the advance of said other implement, and means for adjusting said fork-frame.

In witness whereof I have hereunto set my hand in the presence of two witnesses.

SAMUEL MACLEOD MARTIN.

Witnesses:
GEORGE S. INMAN,
DANIEL F. MACDONALD.